United States Patent

Conway et al.

[11] Patent Number: 5,957,425
[45] Date of Patent: Sep. 28, 1999

[54] SAFETY SIGN POST WITH BREAKAWAY CONNECTION

[75] Inventors: Steven J. Conway, Marion, Ohio; Frederick Mauer, IV, Portsmouth, N.H.

[73] Assignee: The Marion Steel Company, Marion, Ohio

[21] Appl. No.: 08/614,529

[22] Filed: Mar. 13, 1996

[51] Int. Cl.$^6$ .................................................... E04B 1/00
[52] U.S. Cl. ............................ 248/548; 52/98; 248/900; 403/2; 404/10
[58] Field of Search ................................. 248/548, 900; 403/2; 404/10; 52/98

[56] References Cited

U.S. PATENT DOCUMENTS

| | | | |
|---|---|---|---|
| 2,449,056 | 9/1948 | Clark | 403/312 |
| 3,004,637 | 10/1961 | Heintzmann | 403/22 |
| 3,900,269 | 8/1975 | Pavlot | 403/363 |
| 3,912,404 | 10/1975 | Katt | 403/2 |
| 3,912,405 | 10/1975 | Katt | 403/2 |
| 4,126,403 | 11/1978 | Sweeney et al. | 403/2 |
| 4,615,156 | 10/1986 | Deike | 52/98 |
| 4,858,876 | 8/1989 | Moreno | 248/545 |
| 4,926,592 | 5/1990 | Nehls | 52/98 |
| 4,928,446 | 5/1990 | Alexander, Sr. | 403/2 X |
| 5,004,366 | 4/1991 | Simmons | 403/2 |
| 5,066,163 | 11/1991 | Whitaker . | |
| 5,088,683 | 2/1992 | Briden . | |
| 5,090,348 | 2/1992 | Hugron . | |
| 5,125,194 | 6/1992 | Granger | 403/2 X |
| 5,165,818 | 11/1992 | Newhart . | |
| 5,205,236 | 4/1993 | Hughes . | |
| 5,214,886 | 6/1993 | Hugron . | |
| 5,273,371 | 12/1993 | Hugron . | |
| 5,524,858 | 6/1996 | Friend | 248/548 |
| 5,794,910 | 8/1998 | Granger | 248/548 |

OTHER PUBLICATIONS

Metcalf, Ho, Kalevala; Small Sign Support Investigation, Paper No. 930224; pp. 4 and 5, Table 5 and Table 6; Transportation Research Board Annual Meeting in Washington, D.C. Jan. 10–14, 1993.

Metcalf, Ho, Kalevela; Small Sign Support Investigation, Report No. AZ–SP–9202; May 1992; pp. 14, 28, 30, 33, 34, 40 and 41; Arizona Department of Transportation, Phoenix, Arizona.

Primary Examiner—Derek J. Berger
Attorney, Agent, or Firm—Dennis H. Lambert, Esq.

[57] ABSTRACT

A breakaway safety sign support post for obtaining predictable and reliable separation of an upper post section from a lower post section anchored in a substrate, when the post is struck by a vehicle. In a specific construction, the lower post section is adapted to be imbedded in the ground, with an upper end projecting a predetermined limited distance above the surface of the ground. The upper, post section is secured in overlapping, parallel relationship with the lower post section and is secured thereto with frangible fasteners to define a breakaway joint. The post sections each have a U-shaped transverse cross-sectional shape, including a longitudinal center web with a plurality of holes spaced uniformly along its length, and outwardly divergent side walls at opposite sides of the web, terminating in laterally outwardly projecting flanges. When nested together in overlapping relationship, the outwardly divergent side walls lie in surface-to-surface contact with one another and the webs are in spaced apart relationship. In accordance with the invention, an elongate spacer bar is engaged between the spaced apart webs and is secured to the post sections by the fasteners extended therethrough. In particular, the spacer bar has threaded openings at its opposite ends and the fasteners are threaded bolts engaged through the spacer bar. The spacer bar extends substantially completely along the overlapped end portions of the upper and lower post sections, stiffening the splice and providing adequate strength to absorb ambient wind loads, and at the same time providing a predictable and reliable breakaway joint when an errant vehicle collides with the sign post. The threaded spacer bar also insures that the fasteners are in properly spaced relationship to one another, and facilitates the ease of installation, whereby one person can install the breakaway sign support post of the invention.

10 Claims, 4 Drawing Sheets

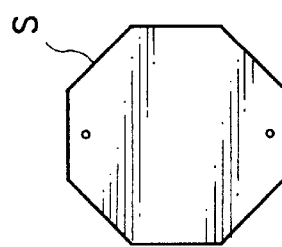
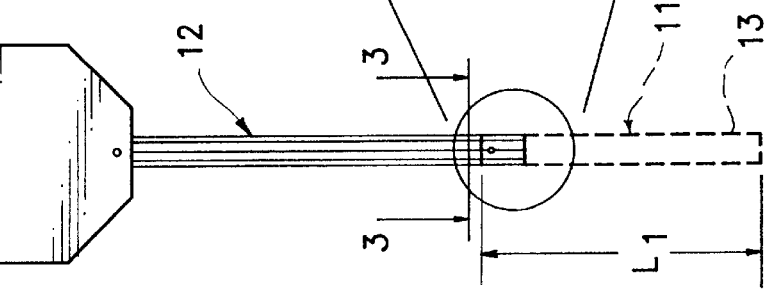
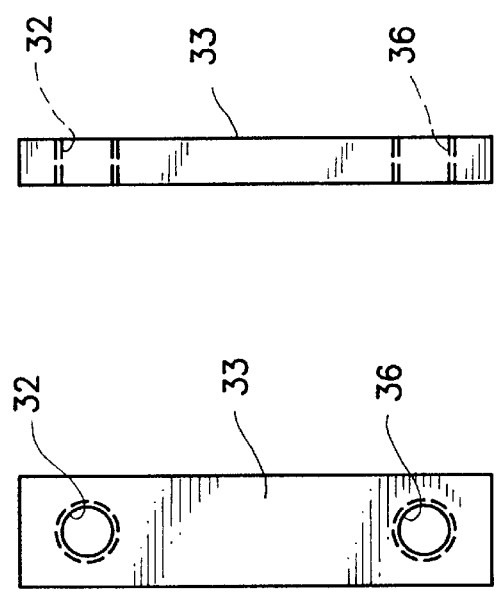
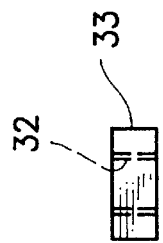

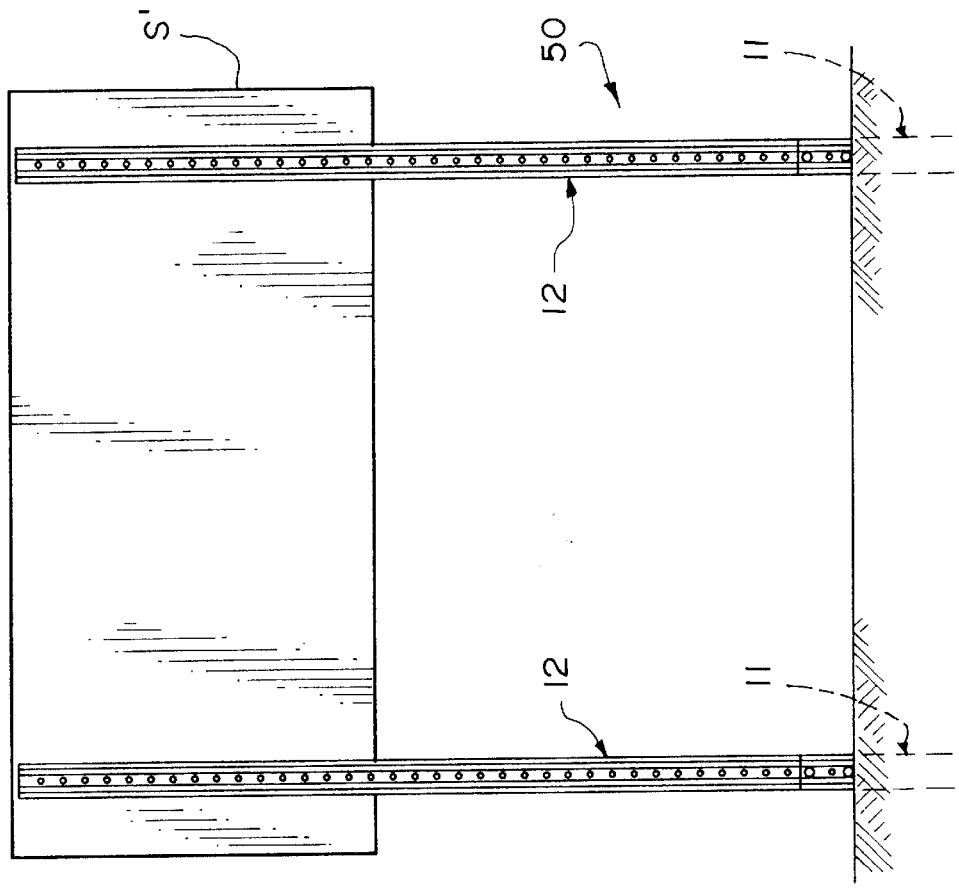
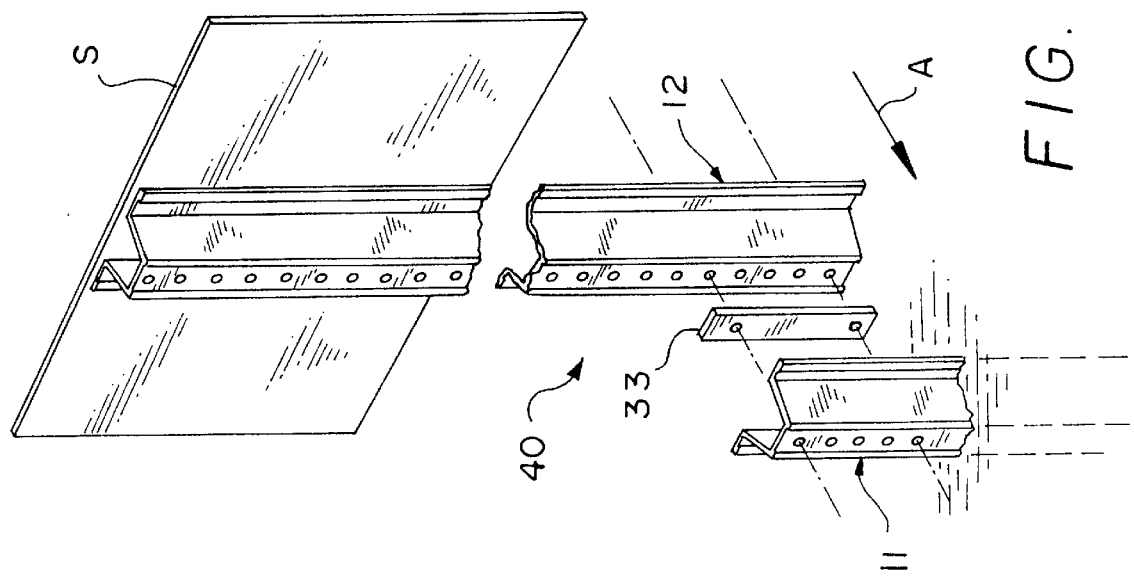

SAFETY SIGN POST WITH BREAKAWAY CONNECTION

BACKGROUND OF THE INVENTION

1. Field of the Invention

This invention relates to sign post constructions, and particularly to a highway sign post construction that has a breakaway joint for safety purposes. The invention represents an improvement over applicant's earlier U.S. Pat. No. 5,125,194.

2. Prior Art

Federal, state and local governments require that sign posts and other structures associated with road construction be of a type designed to insure the safety of motorists in the event of a collision with the sign posts or other structures. Specifically, the Federal Highway Administration (FHWA) sets standards and oversees the design and construction of traffic sign posts on federal highways. Sign supports must also conform to standards set by the National Cooperative Highway Research Program (NCHRP) and American Association of State Highway Transportation Officials (AASHTO).

As determined by tests and usage experience, breakaway sign posts have proven to be highly effective in reducing vehicle damage and occupant injury resulting from collision with highway marker signs. A variety of breakaway sign post constructions intended to meet safety requirements for highway installations are therefore used in the prior art for installation of highway traffic signs.

Conventional breakaway connections are typically provided between a relatively short section of post (base post or ground post) that is driven into the ground, and a longer section of post (support post) that extends upwardly above the ground from the base post and supports the sign. When a motor vehicle collides with the sign post or posts, the section of the sign post above the ground is typically sheared off or hinged over to allow the motor vehicle to continue on its path with minimum damage to the vehicle and without injury to its occupants. Federal and state law typically require that the ground post extend no more than four inches above the ground following a collision to avoid damage to fuel lines or penetration of the vehicle passenger compartment as the vehicle passes over the broken-off posts.

One particular type of sign post that has been used extensively in the prior art comprises a steel U-channel having a flat, longitudinal center web with angularly outwardly divergent side walls terminating in lateral flanges. Spaced apart holes are provided through the center web along the length of the sign post to permit mounting of a sign to the post at a selected height with one or more suitable fasteners, such as bolts or screws, and to accept fasteners for securing sections of the post together to provide the breakaway joint.

It is important that a predictable and reliable breakaway splice or connection be provided between the post sections to insure that the sign post will break without imparting excessive force to the vehicle or causing injury to its occupants, and to insure that the stub height of the ground post does not cause damage to the vehicle as the vehicle passes over the ground post following a collision. It is also important that such sign posts be capable of withstanding ambient wind loads normally encountered by highway sign installations. Experience has shown that signs supported by a single support post, especially, tend to flutter when subjected to wind loads, and this fluttering action imposes torsion on the post and fasteners holding the post sections together. This torsional loading of conventional sign posts and fastener systems leads to frequent failure of the fasteners and/or posts. Evidence indicates that in the majority of failures due to wind load, the top bolt fails first, followed by failure of the U-channel post in the vicinity of the splice.

Prior to the invention described in applicant's earlier U.S. Pat. No. 5,125,194, U-channel post sections were secured together either without any spacers in the spliced joint or with improper spacers. This resulted in the load being carried by the fasteners and by contact between the sides of the U-channel. Because of the configuration of such U-channel post constructions, the webs remain spaced apart, and tightening of fasteners extended through the splice resulted in deformation of the post sections. The result was unpredictable failure of the sign posts in the event of a collision, and frequent failure due to torsional stress transferred to the fasteners under varying wind loads on the sign carried by the post. Applicant's earlier invention provided spacers between the U-channel sections, preventing deformation of the posts when the fasteners are tightened, and insuring predictable behavior of the spliced connection.

Further, prior to applicant's earlier invention it was very difficult for one person to assemble a sign post from upper and lower sections, since that person was required to extend multiple fasteners through the lower post section, hold the upper post section in proper orientation while positioning it over the fasteners, without dislodging the fasteners, and then secure the fasteners by placing and tightening washers and nuts on them, for example, all while holding the upper post section in proper upright position. Applicant's earlier invention of threaded spacers for engagement on the fasteners solved this problem.

However, it was found that many contractors installing highway sign posts frequently utilized improper spacing between the fasteners, even when using applicant's threaded spacers, leading to unpredictable behavior of the splice and premature failure due to ambient wind loads on the installation.

Moreover, the use of multiple, spaced apart spacers in the prior art installations, including that disclosed in applicant's U.S. Pat. No. 5,125,194, resulted in an area between the two fasteners that was effectively hollow, with two substantially solid bearing areas located at the fasteners. This produced two spaced apart relatively small bearing areas.

Accordingly, there is need for a highway sign post breakaway connection that is easy to install and predictable in operation, with means to insure that the fasteners used to couple the sign post sections together are properly spaced, and with means providing uniform and maximum bearing area between the nested U-channel post sections at the spliced connection to ensure proper strength in the joint and concentration of force in the fasteners so that predictable failure occurs in the fasteners rather than in the post sections.

SUMMARY OF THE INVENTION

Accordingly, it is an object of the invention to provide a breakaway sign post construction that is reliable and predictable in operation.

Another object of the invention is to provide a breakaway sign post construction having a nested splice connection with means insuring proper spacing of the fasteners used to secure the spliced connection together.

Another object of the invention is to provide a breakaway sign post construction having a breakaway joint that is capable of absorbing torsional forces imposed on the joint by ambient wind loads and which fails predictably when an errant vehicle collides with it.

Another object of the invention is provide a breakaway sign post construction having means to facilitate installation and which ensures proper spacing of the fasteners used to secure the breakaway connection.

A further object of the invention is to provide a breakaway sign post construction comprising two U-channel post sections nested together at a frangible splice, with a spacer engaged between the U-channel post sections to provide a large bearing area, rigidifying the spliced connection, and insuring predictable performance of the breakaway connection when a vehicle collides with the sign post.

These and other objects and advantages of the invention are achieved by a U-channel sign post support comprising a pair of U-channel sections joined together at a breakaway joint formed by overlapping the U-channel sections and nesting them together in secured relationship with frangible fasteners. One of the U-channel sections comprises a ground or base post section which is driven into the ground, and an upper support post section which extends upwardly from the ground post and supports a highway marker sign at its upper end.

The upper end of the ground post projects above the surface of the ground a distance of only four inches, so that if the sign post is struck by an errant vehicle the remaining ground post projecting above the ground after the breakaway sign post connection separates will not rupture fuel lines or penetrate the passenger compartment of the vehicle as it passes over the ground post.

In order to facilitate installation of the breakaway sign support system of the invention, an elongate spacer bar is provided for connection with a pair of spaced apart, threaded fasteners extended through openings in the ground post and through aligned threaded openings in the spacer, whereby the spacer is secured to the ground post and the fasteners are disposed in properly spaced apart relationship to one another. The sign support post may then easily be placed over the protruding ends of the secured fasteners, and nuts threaded on the protruding fastener ends to secure the support post section to the ground post section, with the spacer sandwiched therebetween.

When U-channel post sections are disposed in overlapping relationship with one another at adjacent ends, the divergent sides of the respective channel members contact one another, holding the webs of the channel members spaced apart. The spacer used in the invention fills the space between the webs, resulting in an essentially solid structure and providing a substantial bearing area. This arrangement prevents inadvertent deformation of either or both of the sign post sections as the support is being installed, and stiffens the spliced joint so that force is concentrated in the fasteners when the sign post is struck by an errant vehicle, so that the fasteners rather than the sign post sections will fail, thereby providing a predictable behavior for the breakaway sign post support.

Threaded attachment of the spacer bar on the fasteners enables a single person to easily install the breakaway sign post of the invention, with the two fasteners first being extended through holes in the web of one post section and threadably engaged with the spacer bar to secure the spacer bar against the post section, i.e., the ground post. The upwardly extending sign support post section is then placed on the protruding ends of the fasteners, followed by threaded engagement of nuts over the protruding ends to secure the upwardly extending sign support section to the ground post section. Threaded engagement of the spacer on the fasteners also effectively shortens the length of the fasteners between its points of attachment, thereby obtaining more predictable behavior of the fasteners during failure.

BRIEF DESCRIPTION OF THE DRAWINGS

The foregoing as well as other objects and advantages of the invention will become apparent from the following detailed description when considered in conjunction with the accompanying drawings, wherein like reference characters designate like parts throughout the several views, and wherein:

FIG. 5 is a front view in elevation of the spacer bar used in the frangible joint of the breakaway sign post construction of the invention;

FIG. 6 is a side view in elevation of the spacer of FIG. 5;

FIG. 7 is a top plan view of the spacer of FIG. 5;

FIG. 8 is a much reduced view in front elevation of a typical sign post installation using the breakaway sign post construction of the invention;

FIG. 8A is an enlarged fragmentary view of the area circled in FIG. 8;

FIG. 9 is an exploded top perspective view of the breakaway sign post assembly of FIG. 1, but with the sign support post positioned in front of the ground post; and FIG. 10 is a rear view in elevation of a typical highway sign installation wherein two breakaway sign support posts are used to support the sign.

DETAILED DESCRIPTION OF THE PREFERRED EMBODIMENTS

Figure 1:
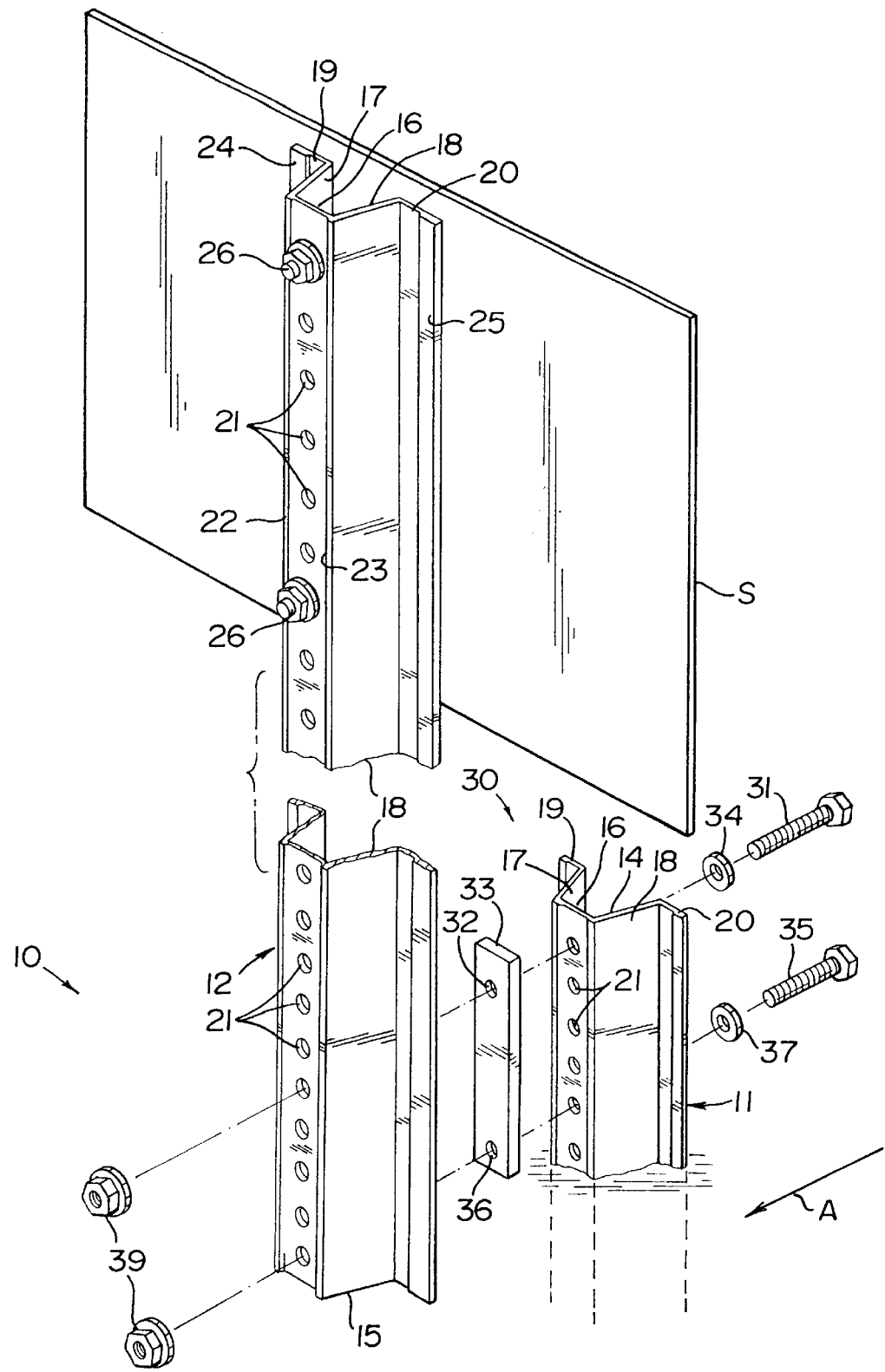
FIG. 1 is an exploded top perspective view, with portions broken away, of a breakaway sign support post assembly according to the invention.

Referring more specifically to the drawings, a first form of easy-to-install, ground-mounted, bolted breakaway safety sign support post system according to the invention is indicated generally at 10 in FIG. 1.

The breakaway safety sign post construction 10 comprises first and second elongate U-channel post sections 11 and 12 joined together in overlapping relationship at their adjacent ends near the surface of the ground in which the sign post is mounted. As described more fully hereinafter, the overlapping joint between the sign post sections is designed to fail or break away when an errant vehicle collides with the sign post. In addition, the breakaway joint is designed to withstand ambient wind loads, which may exceed seventy miles per hour.

The post section 11 comprises a ground post or stub post having a length $L_1$, and preferably a square cut lower end 13, and is driven into the ground until the upper end 14 extends above the surface of the ground a distance of only four inches (see FIG. 8A).

Support post section 12 may have any suitable length, e.g., up to about twenty feet when multiple posts are used, and is overlapped with the exposed upper end of ground post 11 and secured thereto to extend upwardly from the ground to support a sign S at its upper end. In installations utilizing only a single sign support post, the support post 12 typically has a length of from about seven feet to about ten feet, although other lengths could be utilized, as appropriate.

Each sign post section is generally U-shaped in transverse cross-section, having a longitudinal center web 16, and outwardly divergent side walls 17 and 18 terminating in laterally outwardly projecting flanges 19 and 20. Uniformly spaced apart openings 21 are formed through the web 16 completely along its length. Reinforcing ribs 22 and 23 are formed along opposite side edges of the web 16, and reinforcing ribs 24 and 25 are formed along the outer edges of the flanges 19 and 20, adding significantly to the strength of the post sections.

Sign S may be secured to the upper end of the top post section 12 in any suitable conventional way, as by the use of bolts, screws, or other suitable fasteners 26.

The breakaway joint 30 of the invention is seen best in FIGS. 1–4, and is formed by extending an elongate bolt 31 through the topmost hole or opening 21 in the ground post 11 and threading the bolt into a first threaded opening 32 at one end of an elongate spacer bar 33 to snugly secure the spacer bar against the web 16 between the ribs 22 and 23. A washer 34 is also preferably engaged under the head of the bolt 31 prior to extending it through the opening 21 at the top of ground post 11. A second elongate bolt 35 is extended through another opening 21, spaced downwardly from the topmost opening, and threaded into a second threaded opening 36 at the other end of spacer bar 33 to securely snug the spacer bar against the web 16 of ground post 11. A washer 37 is also preferably engaged beneath the head of bolt 35.

Following threaded engagement of the bolts 31 and 35 in the threaded openings 32 and 36 at opposite ends of spacer bar 33, the lower end 15 of support post section 12 is engaged over the exposed ends of the bolts by extending the ends through aligned openings 21 in the lower end of support post section 12. Lock nuts 39 are then engaged on the ends of bolts 31 and 35 to securely fasten the support post 12 to the ground post 11, with the spacer bar 33 sandwiched between the webs 16 of the two post sections.

Figure 3:
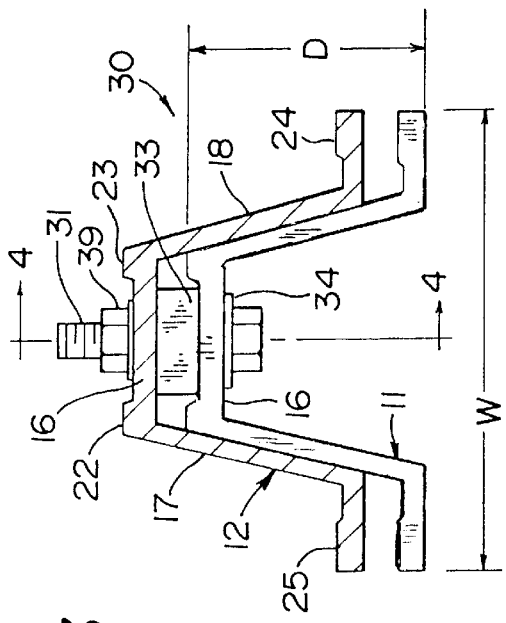
FIG. 3 is a transverse sectional view taken along line 3—3 in FIG. 8.
Figure 4:
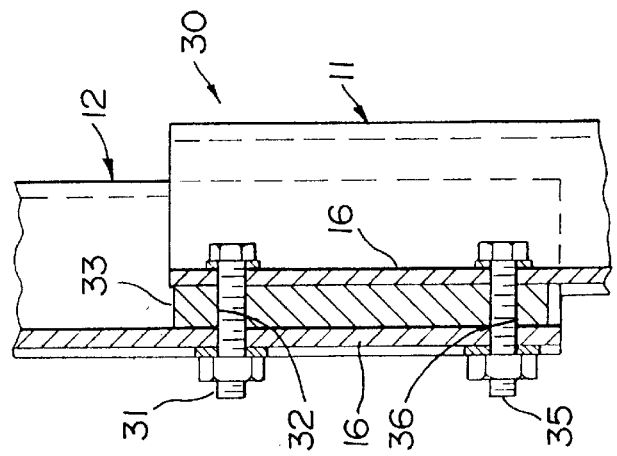
FIG. 4 is a longitudinal sectional view taken along line 4—4 in FIG. 3.
Figure 2:
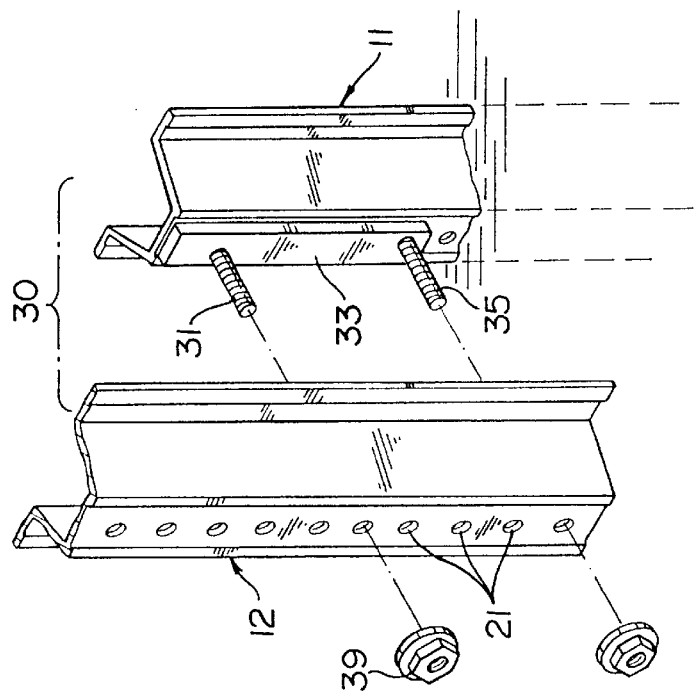
FIG. 2 is an enlarged fragmentary perspective view of the breakaway sign support post assembly of FIG. 1, with the elongate spacer bar secured to the ground post by the fasteners extended therethrough, preparatory to attaching the upwardly extending sign support post section.

With particular reference to FIGS. 3 and 4, it can be seen that this construction provides a very solid connection between the overlapped post sections, with large bearing areas for transfer of forces. That is, not only are the outwardly divergent side walls 17 and 18 of the respective post sections in substantial contact with one another, but the elongate spacer bar 33 provides a substantial bearing area between the respective webs 16 and fills the space therebetween, defining a substantially solid joint, and insuring that tightening of the nuts 39 on bolts 31 and 35 does not cause deformation of the webs.

A first variation of the invention is indicated generally at 40 in FIG. 9. This form of the invention is identical to that illustrated in FIGS. 1–8A, except that the support post section 12 is positioned in front of the ground post section 11 relative to the direction of travel of traffic, as indicated by the arrow A. The normal mounting, however, is with the sign support section 12 positioned behind the ground post section 11, as shown in FIG. 1.

A still further variation is indicated generally at 50 in FIG. 10, wherein a larger sign S' is supported a the top of a plurality of support posts 12, shown here as two in number. It should be understood that more than two posts may be used, when necessary or appropriate. In all other respects, this form of the invention is identical to those previously described, especially with reference to the breakaway joint between the support post sections 12 and the ground post sections 11.

In a specific construction of the present invention, the U-channel post sections are fabricated from hot rolled new billet carbon steel bars having a yield strength of 80 KSI, and may range in size from two pounds per foot up to four pounds per foot, depending upon the requirements of a particular installation.

In this specific construction, the ground post section 11 has a length of forty-two inches, and the support post section 12 has a length ranging up to about twelve feet, in six inch increments. The holes 21 formed through the post sections have a diameter of ⅜ inch and are spaced apart one inch, center-to-center, with the first hole being located one inch from the top of the respective posts. It should be noted that holes need not be formed throughout the length of the ground post, but should extend at least over the top eighteen to twenty inches of the ground post. The posts are machine-straightened to have a smooth, uniform finish, with straightness varying no more than one-quarter inch in five feet. Following fabrication, the posts are painted with a MET-ALTIGHT 300 green water-reducible enamel or are galvanized in accordance with the requirements of ASTM A 123.

The bolts 31 and 35 are 5⁄16×1½ inch HS Grade 9 steel bolts and Grade 9 nuts and cut washers. The bolts, nuts and washers are cadmium plated in accordance with the requirements of ASTM A 165 or zinc plated in accordance with the requirements of ASTM B 633.

The bar spacer 33 is fabricated from hot rolled carbon steel bars conforming to ASTM A 36 or M 1020, and is also cadmium or zinc plated. Additionally, the spacer is drilled and tapped with 5⁄16—18 UNC threads, and has an overall length of five inches, a width of ¾ inch, and a thickness of ⅜ or ½ inch. The threaded openings 32 and 36 are disposed four inches apart, center-to-center.

For single post installations in lengths up to about twelve feet, the post sections 11 and 12 each have an overall width W of three and one-half inches and an overall depth D of one and seven-eighth inches. With these dimensions, and the dimensions of the bar spacer and fasteners described above, the post sections 11 and 12 nest snugly together, with the divergent side walls 17 and 18 in substantial surface-to-surface contact and the spacer 33 snugly engaged between the respective webs 16, providing a substantial bearing surface area between the webs and the spacer throughout substantially the entire length of the overlapped joint.

The breakaway sign post construction of the invention has been FHWA and AASHTO approved, and tested for multiple post installations. The single or multiple post installations utilizing the invention stand up to a variety of wind pressure conditions and provide a predictable and reliable breakaway joint to minimize damage to an errant vehicle colliding with the sign post system, and avoid injury to occupants of the vehicle.

The threaded bar spacer 33 enables a single person to install the system, minimizes the number of parts required in the installation, decreases the time to erect sign post installations, insures proper spacing of the attaching bolts, and increases the load bearing area for the spliced connection, all while meeting applicable federal and state regulations.

While particular embodiments of the invention have been illustrated and described in detail herein, it should be understood that various changes and modifications may be made to the invention without departing from the spirit and intent of the invention as defined by the scope of the appended claims.

What is claimed is:

1. A breakaway sign support post for supporting highway marker signs, comprising:

a base post section having a lower end adapted to be secured in a substrate, and an upper end adapted to extend a predetermined distance above the substrate, said base post section having generally a U-shaped transverse cross-sectional shape, with a central flat web and angularly outwardly divergent sides;

an upper post section of the same cross-sectional size and shape as the base post section, having a generally U-shaped transverse cross-sectional shape, with a central flat web and angularly outwardly divergent sides, and a lower end adapted to be secured in overlapping nested relationship with the upper end of the base post section, with the central flat webs of the respective post sections in parallel spaced apart relationship to one another;

a plurality of openings formed through the web along the length of each post section, at least in the overlapped ends thereof;

a pair of spaced apart elongate fasteners adapted to extend through respective pairs of openings in the overlapped ends of the post sections to secure the post sections together in said overlapping nested relationship; and an elongate spacer bar adapted to be interposed between the spaced apart webs of the overlapped post sections, extending from one fastener to the other and filling the space between the webs and the fasteners, defining a substantially solid joint with a single large bearing area between the fasteners when the post sections are secured together in said overlapping nested relationship, said spacer bar having threaded openings in opposite ends thereof, with the openings in alignment with respective pairs of aligned openings through the webs of the overlapped post sections, for threaded engagement with the fasteners when the fasteners are extended through the openings in the post sections, whereby the spacer bar may first be secured to one of the post sections and the other post section then assembled thereto, said spacer bar serving to space the fasteners a predetermined distance apart and to form a single large bearing area extending between the fasteners and to form a mechanical couple between the post sections that effectively resists torsional forces by wind loads thereon, thereby obtaining a durable and reliable breakaway sign support post which exhibits predictable and desirable failure when it is impacted by an errant vehicle.

2. A breakaway sign support post as claimed in claim 1, wherein:

said fasteners comprise bolts, each have a head on one end and threads on the other end for threaded engagement with a nut, said head adapted to engage against one side of the overlapped post sections and said nut adapted to engage against the other side of the overlapped post sections when the post sections are secured together in said overlapping nested relationship, said bolts being freely received in the aligned openings in the post sections.

3. A breakaway sign support post as claimed in claim 1, wherein:

the outwardly divergent sides of the post sections terminate in laterally outwardly extending flanges, and said flanges are spaced from one another when the post sections are secured together in said overlapping nested relationship.

4. A breakaway sign support post as claimed in claim 1, wherein:

the upper post section is secured behind the base post section, and the fasteners and spacer bar are threadably secured to the base post section prior to attachment of the upper post section.

5. A breakaway sign support post as claimed in claim 4, wherein:

said fasteners comprise bolts, each have a head on one end and threads on the other end for threaded engagement with a nut, said head adapted to engage against one side of the overlapped post sections and said nut adapted to engage against the other side of the overlapped post sections when the post sections are secured together in said overlapping nested relationship, said bolts being freely received in the aligned openings in the post sections; and the outwardly divergent sides of the post sections terminate in laterally outwardly extending flanges, and said flanges are spaced from one another when the post sections are secured together in said overlapping nested relationship.

6. A breakaway sign support post as claimed in claim 1, wherein:

said fasteners are spaced apart a distance of four inches.

7. A breakaway sign support post as claimed in claim 6, wherein:

said base post section is adapted to extend above the surface of the supporting substrate a distance of four inches.

8. A breakaway sign support post as claimed in claim 7, wherein:

the openings in the webs are spaced apart one inch, center-to-center, and one of said pair of fasteners extends through the lowermost opening in the upper post section, and the other of said pair of fasteners extends through the uppermost opening in the base post section.

9. A breakaway sign support post as claimed in claim 1, wherein:

said elongate fasteners extend through the top and bottom, respectively, of the joint defined by the overlapped end portions.

10. A breakaway sign support post as claimed in claim 1, wherein:

the divergent sides of the overlapped post sections are in engagement with one another.